Feb. 19, 1935.  F. KLEIN  1,991,394
ENDLESS FILM UNIT
Filed June 21, 1933
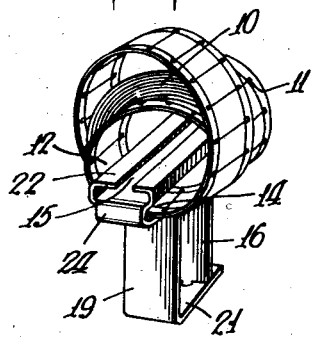
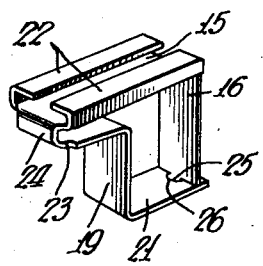
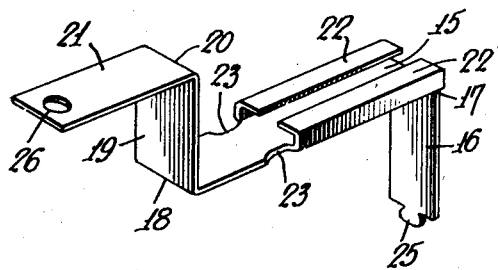
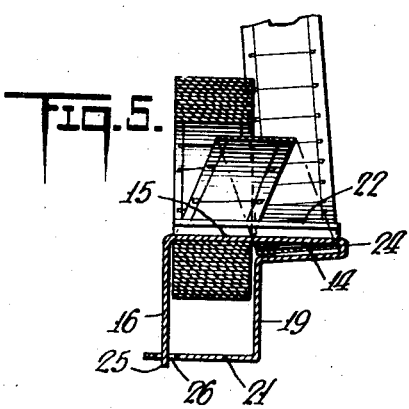
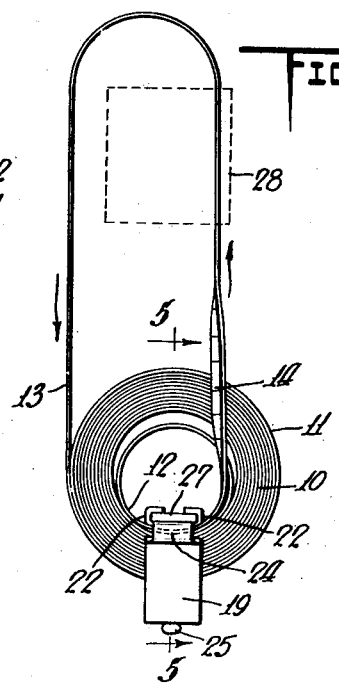
INVENTOR
Frederick Klein
BY
Dean, Fairbank, Hirsch & Foster
ATTORNEYS Patented Feb. 19, 1935

1,991,394

UNITED STATES PATENT OFFICE 1,991,394

ENDLESS FILM UNIT

Frederick Klein, College Point, N. Y.

Application June 21, 1933, Serial No. 676,778

11 Claims. (Cl. 88—18.7)

My present invention relates especially to endless films of short subjects, and while it finds its most particular use in machines employed by the general public for projection in the home, it has a wider field of application in other relations and is particularly useful in machines affording direct visual observation without the aid of artificial light, dark room or screen.

An object of the invention is to provide a film roll assembly including as a part thereof, the instrumentalities for mounting the same with respect to the projecting machine and for reliably feeding and automatically rewinding the same in its course through the projecting machine, so that the film may be viewed repeatedly at any normal speed or may be moved frame by frame when making motion studies.

Another object is to provide an endless film assembly which is inherently proof against tangle of the film convolutions, which may be readily applied into the projecting machine without the exercise of any particular skill, and the use of which dispenses with the need for any auxiliary apparatus to condition the film for re-use.

Another object is to provide an instrumentality of the above type in which conventional film, particularly for short subjects may be employed, the associated part of the assembly of which unit being of substantially negligible cost devoid of mechanism or moving parts and yet serving reliably to feed the film without danger of destruction or excessive wear.

In the accompanying drawing in which is shown one of various possible embodiments of the several features of the invention, Fig. 1 is a perspective view of the complete assembly, Fig. 2 is a perspective view of the combined film roll mount and feed strap in open position, Fig. 3 is a view similar to Fig. 2 showing the strap in closed position but without the film, Fig. 4 is a side elevation of the unit indicating diagrammatically the mode of operation, and Fig. 5 is a transverse sectional view taken on line 5—5 of Fig. 4.

Referring now to the drawing, there is shown more particularly in Fig. 4, an endless film roll, which comprises a multiplicity of concentric convolutions 10 determining the roll, with an outer periphery 11 and an inner periphery 12. The end of the inner periphery 12 is endlessly joined to the beginning of the outer convolution 11 by an external loop 13, the film portion 14 emerging from the inner roll, of course, extending laterally outward from the roll.

While the invention is not limited to such use, it finds a particular application to short subject endless rolls, usually about 10 feet in length and of narrow gauge film usually ⅝" in overall width.

According to the present invention, this film roll has associated in an assembly therewith, the combined mounting and guiding device, a simple embodiment of which is separately shown in Figs. 2 and 3. This device briefly considered merely embraces the convolutions of the roll at one part of the periphery thereof, substantially engaging the inner periphery and the two edges of the superposed convolutions and having an offset portion into which enters the innermost convolution for feed to the external loop; said device also being conformed preferably at the innermost part thereof to afford means for mounting the same and with it the roll, in the machine in which the roll is to be use.

In a preferred specific embodiment, the combined mount and guide means comprises a unitary elongated sheet metal stamping shown in open condition in Fig. 2 and in closed condition in Fig. 3. The strap includes a main bar 15 preferably with a sharp angle turn 17 at one end determining a downturned arm 16, a similar sharp angle turn 18 at the other end, determining an upturned arm 19 and another sharp turn 20 determining an outturned lug 21. The main bar 15 of the blank is widened for the major part of the length thereof and the edges turned inward as at 22, to afford a channel mounting conformation to be more fully described below.

The bar 15 has lateral notches 23 immediately beyond the channel formation to facilitate easy bending thereat, to afford the hairpin turn 24 shown in Fig. 3, for completing the assembly of the unit. Arm 16 has a unitary prong 25 at its extremity for entering a corresponding aperture 26 near the extremity of arm 21, to complete the assembly, as shown in Fig. 3. The assembly thus comprises a holder or retainer, the bar 15 of which has the channel formation 22 to be slipped over the flat projection 27 provided on the apparatus in which the film is to be displayed. In the assembled unit, the arms 16 and 19 extend transversely of the opposite edges of the film convolutions as best shown in Fig. 5 and the bar 15 extends transversely of and substantially engages the innermost convolution of the roll, the feeding length 14 of the film extending laterally out of the roll into the offset or hairpin turn guide therefor, determined at the bend 24. The open sheet metal strap being applied through the film roll, the said strap is closed by inserting the prong 25 on arm 16 through the hole 26 on arm 21. The prong may be bent to obtain a permanent hold but the springiness of the metal is sufficient to maintain the interlock without such bending.

The unit being applied to the flat projection 27 of the machine as shown in Fig. 4, and the external loop of the film being threaded through the gate diagrammatically indicated at 28 in Fig. 4, the film is ready for projection or display. As shown in Fig. 4, channel 22 is preferably dropped over the projection 27 on the machine so that the retainer extends downward and the main part of the roll extends upward above the mounting channel, leaving the emerging end 14 to extend upward. The feed of the film in the direction of the arrows occurs by the guide of the innermost convolution through offset 24 and due to the elasticity of the material of the film, the latter reliably rewinds itself without other auxiliary means, upon the external convolution 11.

The endless film roll is distributed by the producer or its agent with the holder or retainer combined as a unitary assembly therewith. The retainer serves at all times to prevent tangling of the roll during inspection, transit, sale and operation.

The retainer while of almost negligible cost, thus not only serves to protect the film but greatly enhances the convenience and facility of using the film in eliminating time consuming manipulation for mounting or rewinding the film, and thereby incidentally helping to lengthen the life of the film.

While the invention finds a useful application in a machine of the general construction of my copending application, Serial No. 676,777 filed concurrently herewith for viewing moving pictures without the aid of artificial light, dark room or screen, it is clear that the invention is applicable to more or less conventional apparatus for projecting moving pictures in the home. It is, moreover, apparent that the general principle of the present invention may be readily applied to commercial projection machines, used in moving picture theatres and in such use, all of the advantages previously set forth would be fully attained.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent of the United States is:—

1. An endless film roll unit including a film roll having a holder straddling the contacting convolutions of film at one localized part of the inner and outer periphery of the roll, said holder having an offset portion extending at an angle to the plane of the roll and accommodating and guiding the movement of the film in use.

2. An endless film roll unit including a film roll having a holder straddling the contacting convolutions of film at one localized part of the inner and outer periphery of the roll, said holder having an offset portion extending at an angle to the plane of the roll and accommodating that portion of the film about to emerge from the roll.

3. An endless film roll unit comprising a film roll having a loop adapted to be disposed with respect to the gate of the machine with which the unit is to be employed, a holder for the film roll, straddling the external and internal convolutions of the roll at one localized part of the periphery thereof, said holder having an offset portion extending at an angle to the plane of the roll and accommodating the part of the film feeding to the external loop, the elasticity of the film causing the loop to feed onto the external convolution of the film as the offset portion of the holder directs film to the loop.

4. An endless film roll unit comprising a combined mounting bracket and guide for the film loop, said latter element having means for affixing the same to the machine in which the film is to be used, having further means for straddling the contacting convolutions of film at one part of the periphery thereof and including guide means extending at an angle to the plane of the roll and serving for progressively directing the endless film in use to feed from the innermost convolution and to wind upon the outermost convolution.

5. An endless film unit comprising a film roll with an external loop, and a metal strap straddling the opposite edges of the convolutions of the roll at one side of the latter, the inner part of said strap substantially engaging the inner periphery of the roll and the outer part of said strap spaced from the outer convolution of said roll, the inner part of said strap including a channel formation for removable mount with respect to the machine, said strap including an offset portion for guiding the feed of the film from the roll for use.

6. A combination endless film unit and holder therefor including a film roll, a unitary sheet metal strap, straddling said roll at one side thereof and extending in contiguity to the inner convolution and both edges of the various convolutions of the film, said strap including an offset for guiding the innermost convolution outward for use.

7. A combination endless film unit and holder therefor including a film roll, a unitary sheet metal strap, straddling said roll at one side thereof and extending in contiguity to the inner convolution and both edges of the various convolutions of the film, said strap including an offset for guiding the innermost convolution outward for use, the innermost part of said strap being turned inward at its edge to afford a channel for mounting of the unit.

8. A film unit comprising an endless film roll having an external loop connecting the innermost convolution to the outermost convolution and including in a unitary assembly therewith, a sheet metal strap having lateral portions straddling the edges of the roll and maintaining them from lateral displacement, the inner part of said strap including a channel formation for mounting, said strap having an offset portion for directing the feed from the innermost convolution into the loop, the ends of said strap being connected together at the exterior of the roll.

9. As an article of manufacture, a strap unit for serving as a mount and guide for an endless roll of film, said strap unit including a strip of sheet metal, with its ends connected together and defining a rectangular holder loop for the film with an offset hairpin turn for serving as a feed guide.

10. As an article of manufacture, a sheet metal strap serving as a mount and as a guide for an endless roll of film, said strap comprising an elongated blank of sheet metal transversely bent to afford three relatively sharp rectangular turns and one hairpin turn, the ends of said strap releasably connected together, the hairpin turn defining a guiding offset with respect to the rectangular roll holder portion determined by the other turns.

11. As an article of manufacture, a sheet metal strap serving as a mount and as a guide for an endless roll of film, said strap comprising an elongated blank of sheet metal transversely bent to afford three relatively sharp rectangular turns and one hairpin turn, the ends of said strap releasably connected together, the hairpin turn defining a guiding offset with respect to the rectangular roll holder portion determined by the other turns, the length of said strap between the hairpin turn and one of the sharp turns being bent inward at its lateral edges to afford a channel formation for mounting.

FREDERICK KLEIN.